US010613993B2

(12) United States Patent
Fel

(10) Patent No.: US 10,613,993 B2
(45) Date of Patent: Apr. 7, 2020

(54) METHOD FOR PROTECTING A PROGRAM CODE, CORRESPONDING SYSTEM AND PROCESSOR

(71) Applicant: STMicroelectronics SA, Montrouge (FR)

(72) Inventor: Bruno Fel, Tullins (FR)

(73) Assignee: STMICROELECTRONICS SA, Montrouge (FR)

(*) Notice: Subject to any disclaimer, the term of this patent is extended or adjusted under 35 U.S.C. 154(b) by 551 days.

(21) Appl. No.: 14/610,924

(22) Filed: Jan. 30, 2015

(65) Prior Publication Data

US 2015/0220456 A1 Aug. 6, 2015

(30) Foreign Application Priority Data

Feb. 3, 2014 (FR) ..................................... 14 00289

(51) Int. Cl.
*G06F 11/30* (2006.01)
*G06F 12/14* (2006.01)
*G06F 12/0802* (2016.01)
*G06F 21/12* (2013.01)

(52) U.S. Cl.
CPC ...... *G06F 12/1408* (2013.01); *G06F 12/0802* (2013.01); *G06F 21/125* (2013.01); *G06F 2212/1052* (2013.01); *G06F 2212/603* (2013.01)

(58) Field of Classification Search
CPC .... G06F 12/0802; G06F 21/12; G06F 21/125; G06F 12/14; G06F 12/1408; G06F 2212/1052; G06F 2212/603
See application file for complete search history.

(56) References Cited

U.S. PATENT DOCUMENTS

| 6,044,450 A * | 3/2000 | Tsushima ............ G06F 9/30025 712/215 |
| 2008/0141279 A1* | 6/2008 | Mattson .................. G06F 8/453 719/313 |
| 2009/0177873 A1* | 7/2009 | Sato ........................ G06F 21/54 712/233 |
| 2010/0030967 A1* | 2/2010 | Aciicmez ............ G06F 12/0842 711/125 |
| 2010/0042824 A1* | 2/2010 | Lee ..................... G06F 21/6218 713/2 |

(Continued)

OTHER PUBLICATIONS

Gelbart et al., "CODESSEAL: Compiler/FPGA Approach to Secure Applications," in Field Programmable Logic and Application, Springer Berlin Heidelberg, ISI 2005, LNCS 3495, pp. 530-535, 2005.

(Continued)

*Primary Examiner* — Shewaye Gelagay
*Assistant Examiner* — Amie C. Lin
(74) *Attorney, Agent, or Firm* — Seed Intellectual Property Law Group LLP

(57) ABSTRACT

Program code intended to be copied into the cache memory of a microprocessor is transferred encrypted between the random-access memory and the processor, and the decryption is carried out at the level of the cache memory. A checksum may be inserted into the cache lines in order to allow integrity verification, and this checksum is then replaced with a specific instruction before delivery of an instruction word to the central unit of the microprocessor.

37 Claims, 8 Drawing Sheets

1 = Information processing module
2 = Communication medium
3 = Memory controller
4 = Memory
5 = Memory controller
6 = Memory
7 = IP modules
10 = Interface
11 = Central processing unit (CPU)
12 = Cache memory
120 = Level-1 instruction cache
130 = Level-1 data cache
14 = Cache controller
15 = Control circuit
16 = Decryption module
17 = Verification module
18 = Startup controller
180 = Processing circuit
1800 = Initial verification module
1801 = Initial calculation module
19 = Compiler

(56) References Cited

U.S. PATENT DOCUMENTS

| | | | | |
|---|---|---|---|---|
| 2010/0332850 A1* | 12/2010 | Boivie | ............... | G06F 21/125 |
| | | | | 713/189 |
| 2012/0144195 A1* | 6/2012 | Nair | ............... | H04L 63/0428 |
| | | | | 713/168 |
| 2013/0091387 A1* | 4/2013 | Bohnet | ............... | G06F 11/3636 |
| | | | | 714/38.1 |
| 2014/0237255 A1* | 8/2014 | Martin | ............... | G06F 21/6209 |
| | | | | 713/182 |
| 2014/0282883 A1* | 9/2014 | Chan | ............... | H04L 63/10 |
| | | | | 726/4 |
| 2015/0052288 A1* | 2/2015 | Mirichigni | ............... | G06F 12/0891 |
| | | | | 711/103 |

OTHER PUBLICATIONS

Milenković et al., "Hardware Support for Code Integrity in Embedded Processors," Proceedings of the 2005 International Conference on Compliers, Architectures and Synthesis for Embedded Systems, CASES '05, San Francisco, CA, Sep. 27-27, 2005, pp. 55-65.

Patel et al., "Ensuring Secure Program Execution in Multiprocessor Embedded Systems: A Case Study," 2007 $5^{th}$ IEEE/ACM/IFIP International Conference on Hardware/Software Codesign and System Synthesis (CODESS + ISSS), Salzburg, Austria, Sep. 30-Oct. 3, 2007, pp. 57-62.

Ragel et al., "IMPRES: Integrated Monitoring for Processor REliability and Security," ACM/IEEE Design Automation Conference, DAC 2006, San Francisco, CA, Jul. 24-28, 2006, pp. 502-505.

Zambreno et al., "SAFE-OPS: An Approach to Embedded Software Security," *ACM Transactions on Embedded Computing Systems* 4(1):189-210, Feb. 2005.

\* cited by examiner

METHOD FOR PROTECTING A PROGRAM CODE, CORRESPONDING SYSTEM AND PROCESSOR

BACKGROUND

Technical Field

The disclosure relates to the protection of program codes intended to be executed by an information processing module, for example but not limitingly a microprocessor.

The disclosure applies more particularly but not exclusively to "systems-on-chip" (SoC).

Description of the Related Art

Currently, a complex system-on-chip may comprise, in addition to a microprocessor, hundreds of different modules commonly referred to by the person skilled in the art by the acronym IP (Intellectual Property). Most of these modules may contain microcontrollers which execute code. Furthermore, these modules may be used by attackers as entry points for spying, and possibly subsequently modifying the program code executed by the microprocessor.

BRIEF SUMMARY

One embodiment provides protection of a program code intended to be executed by a microprocessor, for example, which makes this program code less sensitive to attacks.

One embodiment also provides protection of a program code which allows verification of the integrity of this program code.

One embodiment furthermore provides a scheme for protecting the program code distributed all along the production and execution sequence, and not only in the startup sequence (better known to the person skilled in the art by the term "boot").

One aspect provides a method for protecting a program code intended to be executed by an information processing module, for example a processor or a microprocessor, comprising at least one level-one cache of a cache memory containing cache lines, each having an address field and a data field, this data field being intended to store instruction words executable by the central unit of the information processing module.

The method according to this aspect comprises:

a) storage of the compiled and encrypted program code in memory locations of a first memory, for example a dynamic random-access memory (DRAM memory), external to the information processing module, these memory locations corresponding to data fields of cache lines, and in the event of a request by the central unit for an instruction word not present in the data field of a cache line of the cache memory, b) extraction from the first memory of the encrypted content of the memory location containing the requested instruction word, and delivery of this encrypted content to the information processing module, and c) decryption of the encrypted content within the information processing module.

Thus, in the event of a "cache miss", the content of a memory location of the first memory, for example the DRAM memory, is delivered encrypted on the communication medium, for example a "network-on-chip" (NoC), to the microprocessor, which carries out the decryption only inside itself, and more particularly locally at the level of the cache memory. For this reason, no unencrypted content of a part of the program code is accessible by an attacker at an entry point of the system.

It is possible for the cache memory to be a hierarchy of caches and, in addition to the level-one cache, to contain at least one higher-level cache, for example a level-two cache and a level-three cache, in which case the level-three cache may optionally be outside the information processing module. In this case, the decryption of the encrypted content is advantageously carried out locally at the level of the level-one cache, that is to say between the level-two cache and the level-one cache, or alternatively downstream of the level-one cache, and the encrypted content delivered to the cache memory remains stored encrypted in the various cache levels of levels greater than or equal to two.

This being the case, there are several possibilities in respect of the time of this decryption in relation to the storage in the cache memory.

Thus, it is possible to carry out, before the decryption of the encrypted content, storage of this encrypted content in the data field of a cache line of the cache memory. In other words, the encrypted content is first stored in the cache memory before carrying out the decryption.

As a variant, it sometimes appears preferable to carry out decryption of the encrypted content then, after this decryption, storage of the decrypted content in the data field of a cache line of the level-one cache of the cache memory.

According to one embodiment, in the event of a request by the central unit for an instruction word already present in an encrypted content of the data field of a cache line of the cache memory, the method advantageously comprises decryption of the encrypted content within the information processing module.

According to a simplified variant, the method comprises, after the decryption, delivery of the requested instruction word to the central unit. In other words, for example, no verification of the integrity of this decrypted content is then carried out before delivery of the requested instruction word to the central unit.

This being the case, in order to further increase the level of security, it is preferable to carry out verification of the integrity of the program code.

Thus, according to one embodiment, the method furthermore comprises, before delivery of the requested instruction word, verification of the integrity of the decrypted content and delivery of the requested instruction word if the result of the verification is representative of an integral content.

More particularly, according to one embodiment, the method comprises:

an initial phase, for example during the compilation of the program code, prior to step a), comprising storage of the modified, compiled and encrypted program code in memory locations of an initial memory, for example a nonvolatile memory of the FLASH type, external to the information processing module, these memory locations here again corresponding to data fields of cache lines, the modified compiled program code comprising instruction word groups which are stored in the memory locations of the initial memory, each instruction word group comprising first instruction words resulting from the compilation of the program code and a second instruction word, for example a "no operation" (better known to the person skilled in the art by the acronym "NOP instruction": No OPeration), all the second instruction words being identical and located respectively at reference positions in the corresponding instruction groups (these reference positions may occupy identical places, for example the last place, in the corresponding instruction groups, or the place of a reference position in the corresponding group may be calculable on the basis of a parameter of the group, for example the address of the cache line or that of its associated memory location), a first phase, for example during the startup (boot) phase, comprising decryption of the modified and compiled code, replacement of the second instruction word of each instruction group with a check indication obtained on the basis of at least some of the first instruction words of the instruction group, for example a "checksum" so as to form a modified instruction group, and encryption of the modified instruction groups, the step a) then comprising storage of the modified encrypted instruction groups in the memory locations of the first memory, for example the DRAM memory, and the verification of the integrity of the decrypted content comprises verification of the integrity of the check indication, an integral check indication being representative of the integral nature of the decrypted content, and if the result of the verification is representative of an integral content, the method furthermore then comprises, before delivery of the requested instruction word to the central unit, replacement of the check indication with the second instruction word, in the case in point the NOP instruction.

A scheme for protecting the program code is then obtained, which is distributed all along the production and execution sequence of this program code, that is to say during the compilation of the program code, during the delivery of this program code from the FLASH memory to the DRAM memory, and during the execution of the program code, by virtue of the fact that the decryption of the program code portion delivered to the microprocessor in the event of a cache miss is only carried out inside the microprocessor, and more particularly locally at the level of the cache memory.

As indicated above, the control indication may be a checksum, and the verification of the integrity of the check indication then comprises, after decryption of the encrypted content, a new calculation of a checksum and a comparison of the checksum present in the decrypted content and the newly calculated checksum.

In order to increase the level of security even more, it is particularly favorable for the first phase to furthermore comprise verification of the integrity of the modified compiled program code before replacement of each second instruction word.

In this regard, the verification of the integrity of the modified program code may here again be carried out with the aid of an additional checksum calculated on the basis of the modified program code. Thus, by way of example, a checksum may be calculated before encryption of the modified program code and storage in the FLASH memory.

As indicated above, the first phase may be carried out when launching a startup program.

Another aspect provides a system, comprising an information processing module comprising at least one level-one cache of a cache memory containing cache lines, each having an address field and a data field intended to store instruction words executable by the central unit of the information processing module, a first memory, external to the information processing module, having memory locations corresponding to data fields of cache lines and intended to store the compiled and encrypted program code, a first memory controller coupled to the first external memory, a communication medium coupled to the first memory controller and to the information processing module, the information processing module furthermore comprising control means configured in order, in the event of a request by the central unit for an instruction word not present in the data field of a cache line of the cache memory, to deliver on the communication medium to the first memory controller a command to read the encrypted content of the memory location containing the requested instruction word, the first memory controller being configured in order to deliver this encrypted content to the information processing module, the information processing module furthermore comprising decryption means configured in order to decrypt this encrypted content.

When the cache memory comprises the level-one cache and at least one higher-level cache, the decryption means are advantageously configured in order to carry out the decryption of the encrypted content at the level of the level-one cache.

According to one embodiment, the control means are configured in order, before the decryption of the encrypted content, to carry out storage of this encrypted content in the data field of a cache line of the cache memory.

According to another possible configuration, the control means are configured in order, after the decryption of the encrypted content, to carry out storage of the decrypted content in the data field of a cache line of the level-one cache of the cache memory.

According to another configuration, in the event of a request by the central unit for an instruction word present in the encrypted content of the data field of a cache line of the cache memory, the decryption means are configured in order to carry out decryption of the encrypted content locally at the level of the level-one cache.

According to a first variant, the control means are configured in order, after the decryption, to deliver the requested instruction word to the central unit.

According to another variant, the system furthermore comprises verification means configured in order, before delivery of the requested instruction word, to carry out verification of the integrity of the decrypted content and to deliver the requested instruction word if the result of the verification is representative of an integral content.

According to one embodiment, the system furthermore comprises an initial memory, external to the information processing module, comprising memory locations corresponding to data fields of cache lines and intended to store a compiled and encrypted modified program code comprising instruction word groups, each instruction word group comprising first instruction words resulting from the compilation of the program code and a second instruction word, all the second instruction words being identical and located at reference positions, for example at the same reference position, in the corresponding instruction groups, an initial memory controller coupled to the external initial memory and to the communication medium, processing means configured in order to carry out decryption of the compiled modified code, to replace the second instruction word of each instruction group with a check indication obtained on the basis of at least some of the first instruction words of the instruction group, so as to form a modified instruction group, and to encrypt the modified instruction groups with a view to the storage of the encrypted modified instruction groups in memory locations of the first memory, and the verification means are configured in order to carry out verification of the integrity of the check indication, an integral check indication being representative of the integral nature of the decrypted content, and if the result of the verification is representative of an integral content, in order to replace, before delivery of the requested instruction word to the central unit, the check indication with the second instruction word.

According to one embodiment, the check indication is a checksum, and the verification means comprise calculation means configured in order to carry out, after decryption of the encrypted content, a new calculation of a checksum and a comparison of the checksum present in the decrypted content and the newly calculated checksum.

According to one embodiment, the processing means furthermore comprise initial verification means configured in order to carry out verification of the integrity of the modified compiled program code before replacement of each second instruction word.

In this regard, the initial verification means may comprise initial calculation means configured in order to calculate an additional checksum on the basis of the modified program code.

The system may comprise a startup controller advantageously containing the processing means.

The system may be a system-on-chip.

Another aspect provides an information processing module, for example a processor or a microprocessor, comprising an interface intended to be coupled to a communication medium,
a central unit,
at least one level-one cache of a cache memory containing cache lines, each having an address field and a data field intended to store instruction words executable by the central unit of the information processing module,
control means configured in order, in the event of a request by the central unit for an instruction word not present in the data field of a cache line of the cache memory, to deliver on the communication medium to an external memory a command to read the encrypted content of the memory location of this external memory containing the requested instruction word, the interface being configured in order to receive this encrypted content, and
decryption means configured in order to decrypt this encrypted content.

According to one embodiment, the control means are configured in order, before the decryption of the encrypted content, to carry out storage of this encrypted content in the data field of a cache line of the cache memory.

According to another possible embodiment, the control means are configured in order, after the decryption of the encrypted content, to carry out storage of the decrypted content in the data field of a cache line of the level-one cache of the cache memory.

According to one embodiment, in the event of a request by the central unit for an instruction word present in an encrypted content of the data field of a cache line of the cache memory, the decryption means are configured in order to carry out decryption of the encrypted content locally at the level of the level-one cache.

According to a first possible variant, the control means are configured in order, after the decryption, to deliver the requested instruction word to the central unit.

According to another possible variant, the module furthermore comprises verification means configured in order, before delivery of the requested instruction word, to carry out verification of the integrity of the decrypted content of the data field of a cache line and to deliver the requested instruction word if the result of the verification is representative of an integral content.

According to one embodiment, the decrypted content of the data field of a cache line contains an instruction word group comprising first instruction words relating to a compiled program code and a check indication, obtained on the basis of at least some of the first instruction words and located at a reference position in the cache line, which may be the same for all the cache lines, and the verification means are configured in order to carry out verification the integrity of the check indication, an integral check indication being representative of the integral nature of the decrypted content, and if the result of the verification is representative of an integral content, in order to replace, before delivery of the requested instruction word to the central unit, the check indication with a second instruction word, this instruction word being identical for all the cache lines.

The second instruction word may be a no operation instruction, and the check indication may be a checksum, and the verification means then for example comprise calculation means configured in order to carry out, after decryption of the decrypted content, a new calculation of a checksum and a comparison of the checksum present in the decrypted content and the newly calculated checksum.

BRIEF DESCRIPTION OF THE SEVERAL VIEWS OF THE DRAWINGS

Non-limiting and non-exhaustive embodiments are described with reference to the accompanying drawings, wherein like labels refer to like parts throughout the various views unless otherwise specified. Other objects, characteristics and advantages of the invention will become apparent on studying the detailed description of embodiments and the appended figures, in which.

DETAILED DESCRIPTION

Figure 1:
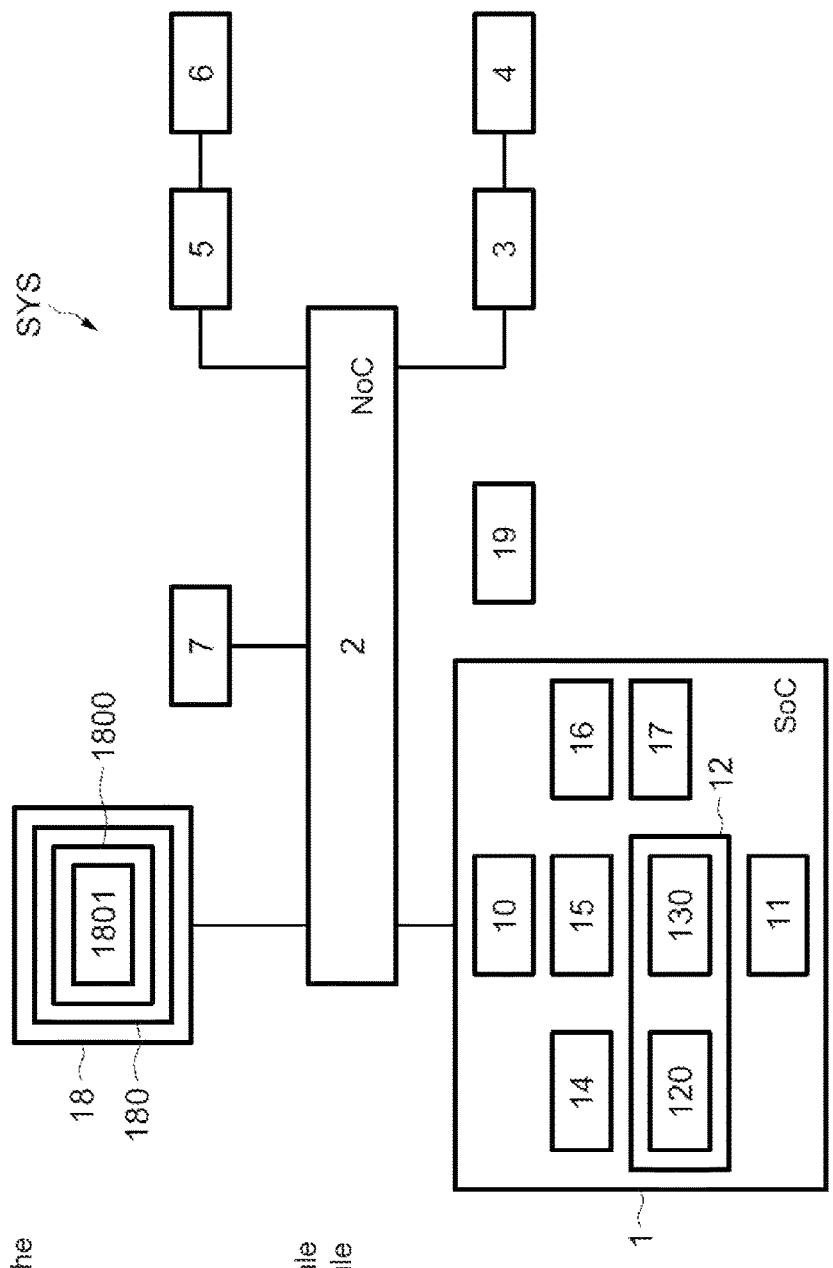
FIG. 1 is a block diagram of a system according to one embodiment of the invention.

In FIG. 1, the reference SYS denotes a system, for example a system-on-chip (SoC), comprising an information processing module 1, for example a microprocessor, coupled to a communication medium 2, in the case in point a network-on-chip (NoC).

Further to the microprocessor 1, the system SYS comprises a memory 4, also referred to as the initial memory, for example a nonvolatile memory of the FLASH type, associated with an initial memory controller 3 coupled to the network 2.

The system SYS also comprises another memory 6, also referred to as the first memory, for example a DRAM memory, as well as an associated first memory controller 5 also coupled to the network 2.

The system SYS also comprises various modules or IP, 7 (a single one being represented for the sake of simplicity) also coupled to the network 2.

Lastly, in the present case the system SYS comprises a startup controller 18 ("boot controller"), also coupled to the network 2 and configured in order to launch a startup ("boot") sequence of the system SYS, and in particular of the microprocessor 1.

In the present case, the startup controller 18 comprises processing means 180, themselves comprising initial verification means 1800 including initial calculation means 1801, which may for example be implemented as software, and which will be returned to in more detail below regarding their function.

The microprocessor 1 comprises an interface 10 coupled to the network 2, a central unit 11 (also known to the person skilled in the art by the acronym CPU: "Central Processing Unit").

In this exemplary embodiment, the processor 1 also comprises a cache memory 12, which will be assumed here only to be of level 1 comprising a level-1 instruction cache 120 and a level-1 data cache 130.

The processor 1 also comprises a cache controller 14, as well as control means 15, decryption means 16 and verification means 17, the functions of which will be returned to in more detail below.

The system SYS furthermore comprises a compiler 19.

Figure 2:
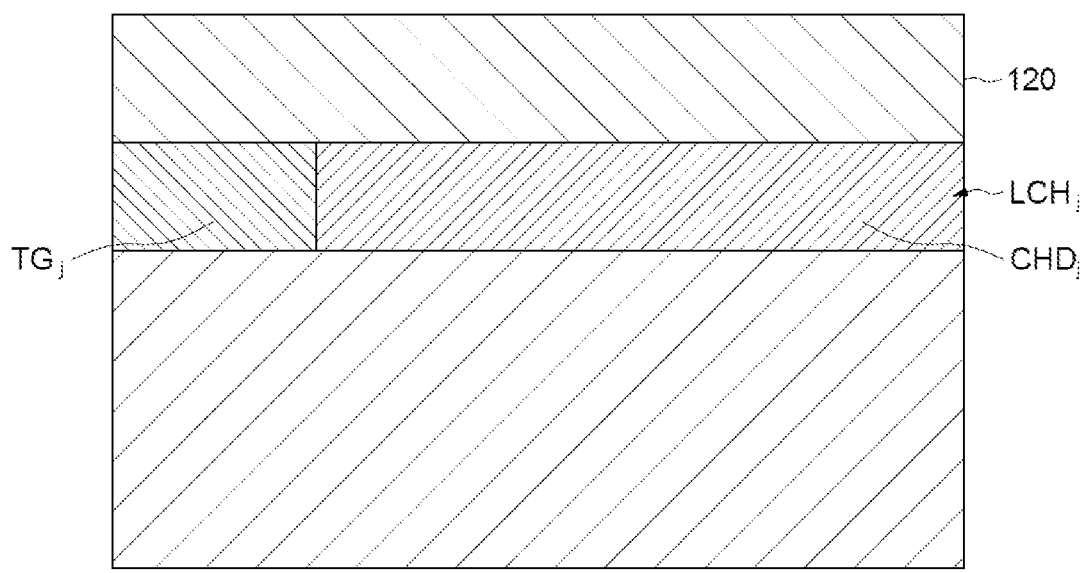
FIG. 2 is a schematic view of an instruction cache of the system of FIG. 1.

As is conventional in the art, and illustrated in FIG. 2, the instruction cache 120 comprises cache lines $LCH_j$, each comprising an address field $TG_j$ and a data field $CHD_j$. The data field $CHD_j$ comprises a plurality of instruction words executable by the central unit 11 of the microprocessor, and the address field $TG_j$ comprises the address of the data field $CHD_j$ in the first memory 6.

Some bits of this address make it possible to identify the various instruction words present in the data field $CHD_j$.

Various embodiments of the method according to the disclosure will now be described with reference to FIGS. 3 to 9.

Figure 3:
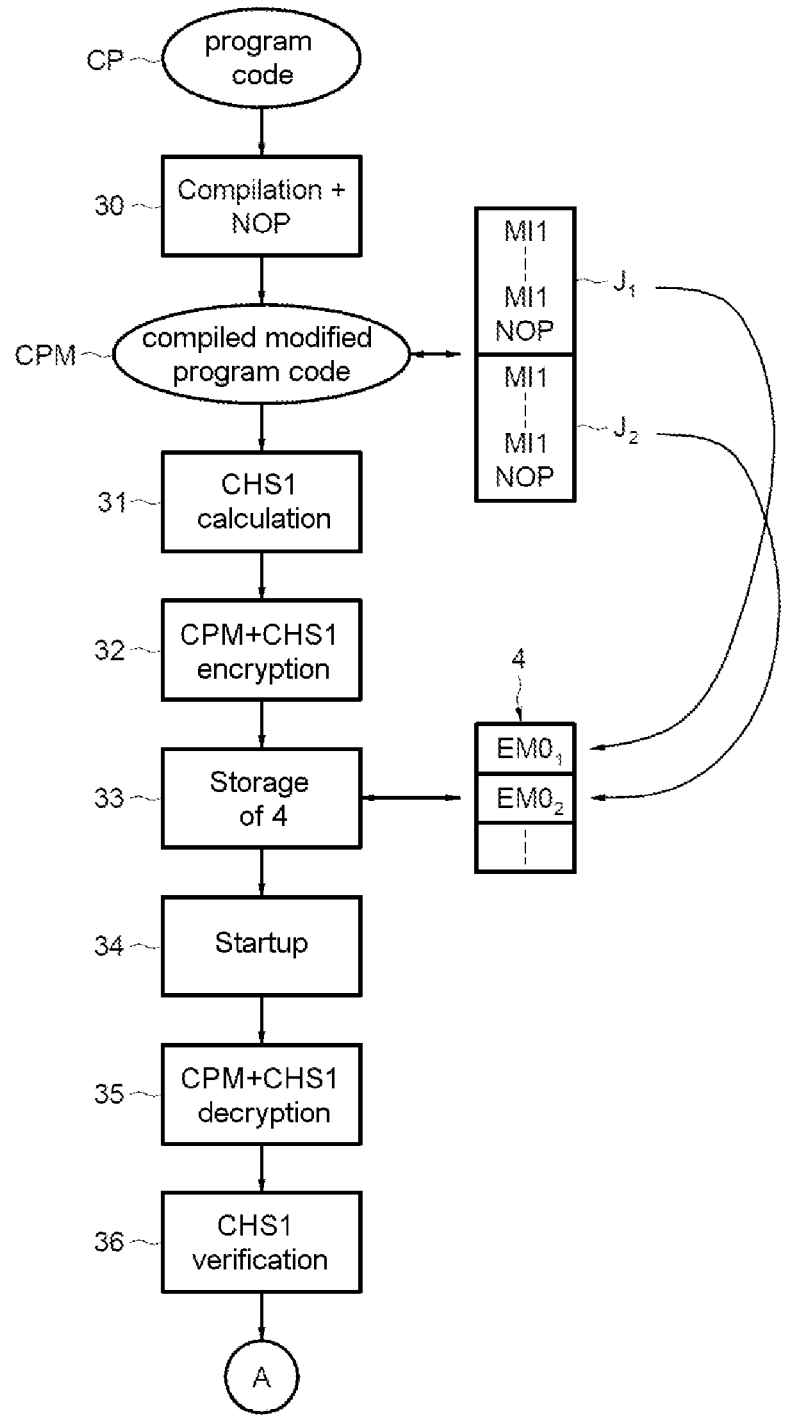
FIG. 3 is a flowchart of a part of a method according to one embodiment of the present disclosure.
Figure 4:
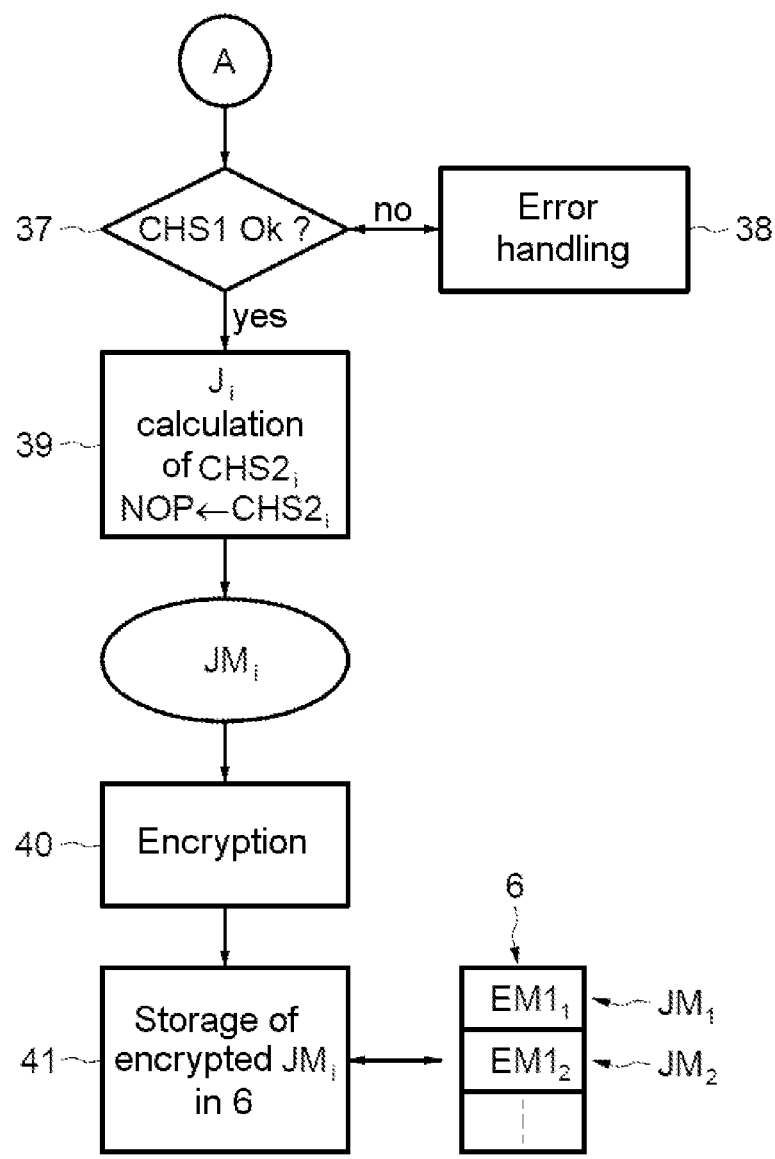
FIG. 4 is a flowchart of another part of the method according to one embodiment of the present disclosure.

In FIG. 3, the reference CP denotes a program code intended to be executed by the microprocessor 1.

In step 30, the program code CP is compiled and supplemented with specific instruction words, in the case in point no operation instructions (NOP instructions), so as to obtain a compiled and modified program code CPM.

As illustrated in this FIG. 3, this compiled modified program code CPM comprises instruction word groups $J_i$.

Each instruction word group $J_i$ comprises first instruction words MI1 resulting from the compilation of the program code and a second instruction word, in the case in point an NOP instruction, all the second instruction words being identical and located at the same position in the corresponding instruction groups.

In the example described here, the NOP instruction is placed at the last place of each instruction group $J_i$.

This being the case, this place could be different so long as it is, for example, identical in each of the groups or easily calculable.

Likewise, the second instruction word could be an instruction other than the NOP instruction, but this would then require the sacrifice of a register of the microprocessor because such an instruction can be executed by the processor.

So as to allow a first level of integrity verification, the compiler 19 carries out a calculation 31 of a checksum CHS1 on the basis of at least some, and in practice all, of the instruction words of the compiled modified program code. The compiled modified program code CPM, as well as the checksum CHS1, are encrypted (step 32) by conventional encryption means, which may be incorporated in the compiler 19. By way of nonlimiting example, an algorithm of the AES type may be used as the encryption algorithm.

The modified, compiled and encrypted program code is then stored (step 33) under the control of the memory controller 3, in memory locations $EM0_i$ of the initial memory 4. These memory locations correspond to data fields of cache lines.

The protection method then comprises a first phase, advantageously carried out during the startup ("boot") phase 34 of the processor. The operations which will now be described are typically carried out by the startup controller 18.

The processing means 180 of the startup controller 18 carry out decryption 35 of the compiled modified program code and of the checksum CHS1, which are stored in the initial memory 4 and extracted from this memory via the memory controller 3.

The initial verification means 1800 then carries out verification 36 of the checksum CHS1. More particularly, in a conventional way, the initial calculation means 1801 are configured in order to calculate again an additional checksum on the basis of the modified program code CPM, and the initial verification means 1800 compare the checksum CHS1 with the additional checksum which has just been calculated (step 37, FIG. 4).

If the verification is found to be negative, that is to say if the two checksums are different, then this is representative of a nonintegral modified program code having been potentially corrupted.

In this case, specific error handling 38 may be applied. The content of such error handling varies depending on the applications and may for example consist in blocking the system SYS.

In the case in which the result of the comparison is positive, that is to say representative of an integral content of the modified program code CPM, the processing means 180 determine (step 39) for each instruction group $J_i$ a checksum $CHS2_i$ obtained on the basis of the instruction words MI1 and NOP of the group $J_i$ and replace the second instruction word, in the case in point the NOP instruction, with this checksum $CHS2_i$, so as to form a modified instruction group $JM_i$.

The processing means 180 then carries out encryption 40 of the modified instruction groups $JM_i$ and stores them (step 41) via the memory controller 5 in the memory locations $EM1_i$ of the first memory 6.

Here again, these memory locations $EM1_i$ correspond to data fields of cache lines.

At this stage, the program code is ready to be executed by the microprocessor 1.

This will be explained in more detail with reference to FIGS. 5 to 9.

Figure 5:
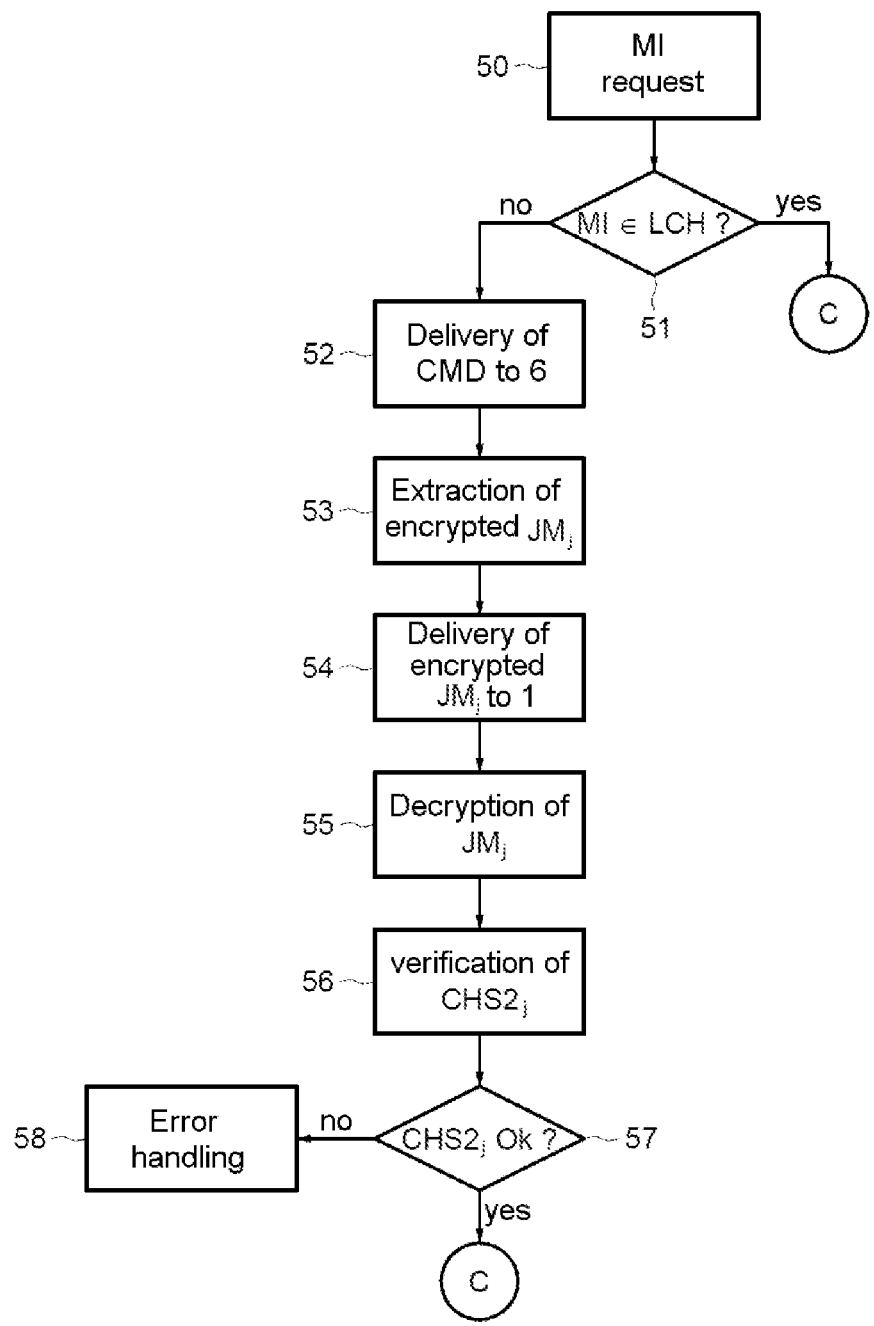
FIG. 5 is a flowchart of another part of the method according to one embodiment of the present disclosure.

It is assumed in FIG. 5 that, in a step 50, the central unit 11 of the microprocessor requests the instruction word MI.

The control means 15, which in practice may for example be implemented as software within the cache controller 14, verify by comparison of addresses in the various address fields $TG_j$ of the cache 12 whether this instruction word MI is present in a cache line LCH of the cache 120.

If this is not the case, that is to say in the event of a cache miss, the control means deliver on the network 2 (step 52) a command CMD to read the encrypted content of the memory location of the first memory 6 containing the requested instruction word. This command consequently contains the address of this memory location.

The memory controller 5 then extracts from this memory location its encrypted content, that is to say the modified encrypted instruction group, which is assumed in this example to be the group $JM_j$.

The memory controller then delivers this encrypted group $JM_j$ on the network 2 to the microprocessor 1 (step 54).

In this alternative embodiment, the decryption means 16, which may also be implemented as software within the cache controller 14, then carry out decryption 55 of the modified encrypted instruction group $JM_j$, and the verification means 17, which may also be incorporated as software within the cache controller, carry out verification 56 of the integrity of this decrypted content, that is to say of the decrypted modified instruction group $JM_j$.

In this regard, the verification means will verify the integrity of the checksum $CHS2_j$ (step 57).

This verification is carried out in a conventional way by recalculation of a new checksum $CHS2'_j$ and by a comparison of the received checksum $CHS2_j$ and the calculated checksum $CHS2'_j$.

In the event of a negative comparison, representative of nonintegrity of the received modified instruction group, the cache controller may implement specific error handling 58.

In the event that the verification of the checksum is representative of an integral content of the modified instruction group $JM_j$ received, the verification means 17 replace the checksum $CHS2_j$ with the second instruction word, in the case in point the NOP instruction, so as to obtain again the instruction group $J_j$ which had been obtained at the end of step 30 in FIG. 3.

This instruction group $J_j$, which comprises the first instruction words MI1 and the NOP instruction, is then stored (step 60) in the data field of a cache line, in the case in point the cache line $LCH_m$.

The requested instruction word MI is then delivered (step 61) to the central unit 11 with a view to its execution, in which case the requested instruction word MI may be either one of the instruction words MI1 or the NOP instruction.

In this embodiment, it is assumed that the decryption of an encrypted content and the verification of the integrity of the decrypted content were carried out before storage in a cache line. Under these conditions, if in step 51 the requested instruction word MI already belongs to a cache line LCH its delivery is carried out directly (step 61).

Other alternative embodiments are possible.

Figure 7:
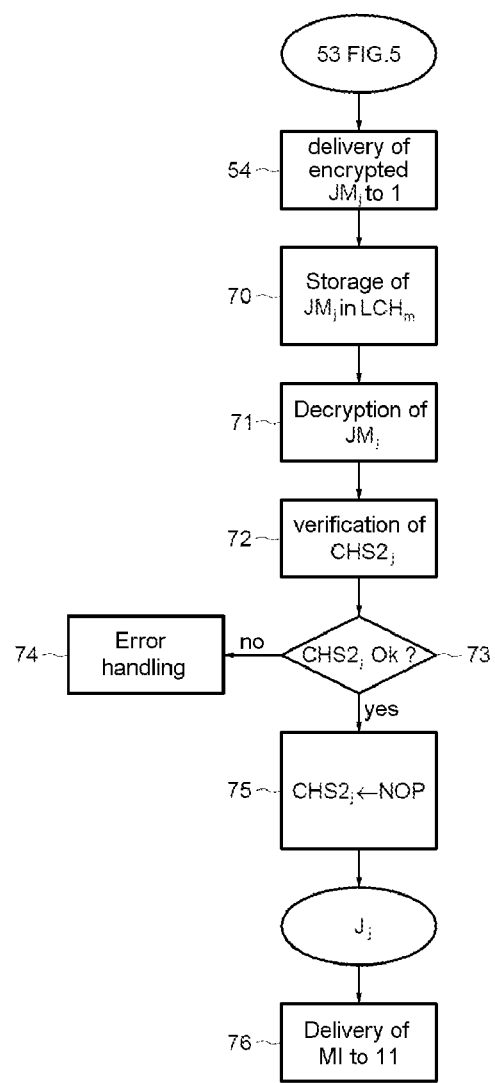
FIG. 7 is a flowchart of another part of the method according to one embodiment of the present disclosure.

Thus, as illustrated in FIG. 7, after delivery of the encrypted modified instruction group $JM_j$ to the microprocessor 1, storage of this encrypted group $JM_j$ in a cache line, in the case in point the cache line $LCH_m$, may be carried out directly (step 70).

The decryption means 16 then carry out the decryption of the modified instruction group $JM_j$ (step 71), and the verification means 17 carry out (step 72) verification of the integrity of the decrypted modified instruction group in a similar way to that described above with reference to step 56 of FIG. 5.

In the case in which this verification processing is representative of a nonintegral content (step 73), error handling 74 is implemented.

Figure 6:
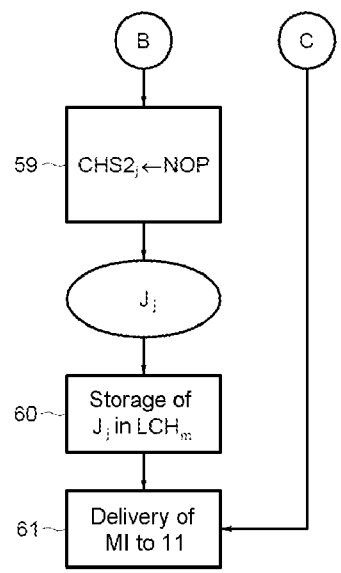
FIG. 6 is a flowchart of another part of the method according to one embodiment of the present disclosure.

If the verification processing is found to be positive, that is to say representative of an integral content of the modified instruction group $JM_j$, the verification means then carry out (step 75) replacement of the checksum $CHS2_j$ with the NOP instruction in a similar way to that described with reference to step 59 of FIG. 6, so as to restore the instruction group $J_j$ then, in step 76, deliver the requested instruction word MI.

Figure 8:
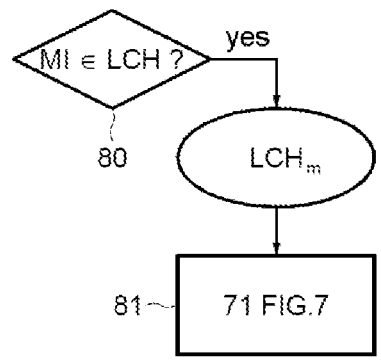
FIG. 8 is a flowchart of another part of the method according to one embodiment of the present disclosure.

If, as illustrated in FIG. 8, the requested instruction word MI belongs to a line LCH, for example the cache line $LCH_m$, the data field which is encrypted, then step 71 of FIG. 7 is proceeded to directly (step 81) in order then to carry out steps 72, 73, optionally 74, 75 and 76.

Figure 9:
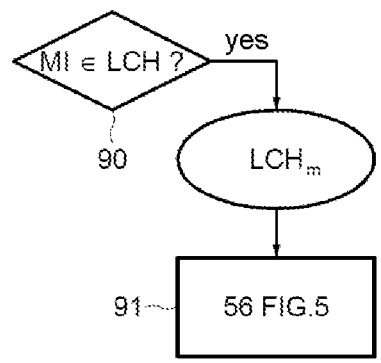
FIG. 9 is a flowchart of another part of the method according to one embodiment of the present disclosure.

It is also possible, as illustrated in FIG. 9, in the case in which the requested instruction word MI belongs to a cache line LCH (step 90), for example the cache line $LCH_m$ already decrypted, that the verification processing is carried out not before the storage of the decrypted content in the cache line but after the storage, before delivery of the requested instruction word.

In this case, step 91 leads directly to step 56 of FIG. 5 so as to execute steps 56, 57, optionally 58 and 59 to 61.

Throughout the description above, it was assumed that the cache memory comprised only a level-one cache.

Figure 10:
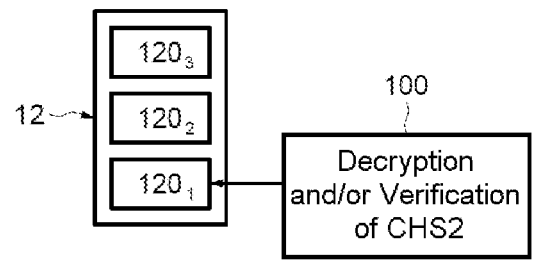
FIG. 10 is a block diagram illustrating a multi-level cache and decryption and/or verification according to one embodiment of the present disclosure.

This being the case, as illustrated in FIG. 10, the cache memory may be a hierarchy of caches and comprise caches of different levels, for example a level-one cache $120_1$, a level-two cache $120_2$ and a level-three cache $120_3$.

Some of these caches, for example the level-three cache, may even be located outside the microprocessor.

In this case, the features discussion above, namely the decryption and the integrity verification, are carried out locally at the level of the level-one cache. In other words, any content decryption will be carried out only either between the level-two cache and the level-one cache or downstream of the level-one cache before delivery of the instruction word to the central unit. Furthermore, any content extracted from the memory 6 will remain encrypted so long as it remains present in a cache of a level higher than level one.

Each cache is associated with a cache controller.

If the requested instruction word is not present in the level-one cache but is present in the level-two cache, for example, the content of the corresponding cache line of the level-two cache remains encrypted in the level-two cache and is delivered by the level-two cache controller to the level-one cache controller. The latter may then store the encrypted content in the cache line of the level-one cache before the decryption, or may alternatively carry out the decryption first before storage.

In the case in which the requested instruction word does not belong to any cache, that is to say in the event of a cache miss, the encrypted content extracted from the DRAM memory is delivered to the level-three cache controller, which is assumed here to be outside the microprocessor. At this stage, the level-three controller may either update the level-3 cache by storing the encrypted content therein then deliver the encrypted content to the microprocessor, and more particularly to the level-two cache controller, or may alternatively deliver the encrypted content directly to the level-two cache controller before updating the level-three cache.

The level-two cache controller may either update the level-2 cache by storing the encrypted content therein then deliver the encrypted content to the level-one cache controller, or alternatively deliver the encrypted content directly to the level-one cache controller before updating the level-two cache. Furthermore, here again, the level-one cache controller may then store the encrypted content in the cache line of the level-one cache before decryption, or alternatively carry out the decryption first before storage.

The invention is not limited to the embodiments which have just been described, but encompasses all variants thereof.

Thus, in a simplified variant, if conduct of the integrity verification processing is not desired, it is possible simply to carry out decryption of the encrypted content extracted from the DRAM memory and deliver the requested instruction word.

Furthermore, the system is not necessarily a system-on-chip (SoC) but may, for example, comprise a processor and external memories connected on a board and mutually coupled by a conventional bus.

A means, or module, as used herein may include a hardware module, such as one or more electronic circuits; a software module, such as one or more processor-executable instructions or one or more representations of processor-executable instructions; or a combined hardware and software module.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to protect program code, comprising:
providing an information processing module having a central processing unit configured to execute the program code;
associating a cache memory with the information processing module, the cache memory having at least one level-one cache, the at least one level-one cache having cache lines, each cache line of the cache lines having two separate and distinct fields, the two separate and distinct fields including an address field and a data field, wherein during execution of the program code, address information is stored in the address field and instruction words of the program code are stored in the data field, the address information stored in the address field corresponding to an address in a first memory where the instruction words of the program code are stored;
storing compiled and encrypted program code in memory locations of the first memory, the first memory external to the information processing module, the memory locations corresponding to data fields of the cache lines, wherein the compiled and encrypted program code includes instruction word groups, each instruction word group of the instruction word groups including first instruction words that result from a compilation of the program code and a second instruction word that does not result from the compilation of the program code, the second instruction word of the each instruction word group of the instruction word groups being identical and located respectively at a reference position in the each instruction word group of the instruction word groups
decrypting the compiled and encrypted program code;
replacing the second instruction word of the each instruction word group of the instruction word groups with a check indication obtained based on at least some of the first instruction words of the each instruction word group of the instruction word groups to form modified instruction groups;
encrypting the modified instruction groups; and
storing the encrypted modified instruction groups in the memory locations of the first memory; and
in response to receiving a request from the central processing unit for an instruction word not present in the data field of a cache line of the cache memory:
extracting from the first memory encrypted content of a memory location containing the requested instruction word;
delivering the encrypted content to the information processing module; and
decrypting the encrypted content within the information processing module, wherein verifying the integrity of the decrypted content includes verifying integrity of an integral check indication, the integral check indication representing an integral nature of the decrypted content, and in response to a result of the verifying is representative of an integral content, before delivering the requested instruction word to the central processing unit, replacing the check indication with the second instruction word.

2. The method according to claim 1, wherein the cache memory having the level-one cache has at least one higher-level cache, and the decrypting of the encrypted content is carried out locally at a level of the level-one cache.

3. The method according to claim 1, comprising:
prior to the decrypting of the encrypted content, storing the encrypted content in the data field of a selected cache line of the cache memory.

4. The method according to claim 1, comprising:
subsequent to the decrypting of the encrypted content, storing the decrypted content in the data field of a selected cache line of the level-one cache of the cache memory.

5. The method according to claim 1, comprising:
in response to receiving a request from the central processing unit for an encrypted instruction word present in the data field of a selected cache line of the cache memory, decrypting the encrypted content within the information processing module locally at a level of the level-one cache.

6. The method according to claim 1, comprising:
subsequent to the decrypting of the encrypted content, delivering the requested instruction word to the central processing unit.

7. The method according to claim 1, comprising:
before the delivering of the encrypted content, verifying integrity of the decrypted content to produce a verification result; and
in response to the verification result is representative of an integral content, delivering the requested instruction word.

8. The method according to claim 1, wherein reference positions occupy identical positions in the instruction groups.

9. The method according to claim 1, wherein the second instruction word is a no operation instruction (NOP).

10. The method according to claim 1, wherein the integral check indication is a checksum, and verifying the integrity of the integral check indication includes, after decrypting the encrypted content, calculating a new checksum and comparing a checksum present in the decrypted content and the new checksum.

11. The method according to claim 1, comprising verifying the integrity of the compiled and encrypted program code before replacement of each second instruction word.

12. The method according to claim 11, wherein verifying the integrity of the compiled, modified, and encrypted program code includes an additional checksum calculated based on the compiled, modified, and encrypted program code.

13. The method according to claim 1, wherein the reference position is calculated by an algorithm.

14. The method according to claim 1, wherein the second instruction word is an executable instruction that uses at least one register of the central processing unit.

15. A system, comprising:
an information processing module having:
a central processing unit; and
a cache memory, the cache memory having at least one level-one cache, the cache memory containing cache lines, each cache line of the cache lines having two separate and distinct fields, the two separate and distinct fields including an address field and a data field, wherein address information is stored in the address field and instruction words executable by the central processing unit are stored in the data field, the address information stored in the address field corresponding to an address in a first memory where the instruction words executable by the central processing unit are stored;
a first memory, external to the information processing module, having memory locations corresponding to data fields of the cache lines, the first memory configured to store compiled and encrypted program code, wherein the compiled and encrypted program code includes instruction word groups, each instruction word group of the instruction word groups having first instruction words that result from a compilation of program code and a second instruction word that does not result from the compilation of the program code, the second instruction word of the each instruction word group of the instruction word groups being identical and located respectively at a reference position in the each instruction word group of the instruction word groups
a first memory controller coupled to the first memory;
a communication medium coupled between the first memory controller and the information processing module;
a control module configured to deliver to the first memory controller on the communication medium, a command to read encrypted content of a memory location containing a requested instruction word, the delivery carried out when the central processing unit requests the instruction word and when the instruction word is not present in the data field of a corresponding cache line of the cache memory, wherein the first memory controller is configured to deliver encrypted content to the information processing module;
a decryption module configured to decrypt the encrypted content;
a processing module configured to:
decrypt the compiled and encrypted program code;
replace the second instruction word of the each instruction word group of the instruction word groups with a check indication obtained based on at least some of the first instruction words of the each instruction word group of the instruction word groups to form modified instruction groups;
encrypt the modified instruction groups; and
store the encrypted modified instruction groups in memory locations of the first memory; and
a verification module configured to verify integrity of an integral check indication, the integral check indication representing an integral nature of the decrypted content, and in response to a result of the verification is representative of an integral content, before delivering the requested instruction word to the processing unit, replacing the check indication with the second instruction word.

16. The system according to claim 15, wherein the cache memory having the level-one cache has at least one higher-level cache, and wherein the decryption module is configured to decrypt the encrypted content locally at a level of the level-one cache.

17. The system according to claim 15, wherein the control module is configured to store the encrypted content in the data field of a selected cache line of the cache memory before decrypting the encrypted content.

18. The system according to claim 15, wherein the control module is configured to store decrypted content in the data field of a selected cache line of the level-one cache of the cache memory after the decryption of the encrypted content.

19. The system according to claim 15, wherein the decryption module is configured to carry out decryption of the encrypted content locally at a level of the level-one cache in response to a request by the central processing unit for an encrypted instruction word present in the data field of a selected cache line of the cache memory.

20. The system according to claim 19, wherein the processing module includes an initial verification module configured to verify integrity of the compiled and encrypted program code before replacement of each second instruction word.

21. The system according to claim 19, comprising:
a startup controller, the startup controller containing the processing module.

22. The system according to claim 15, wherein after decryption, the control module is configured to deliver the requested instruction word to the central processing unit.

23. The system according to claim 15, wherein:
the verification module is configured to verify integrity of the decrypted content before the requested instruction word is delivered and the verification module is configured to deliver the requested instruction word in response to a result of verifying the integrity of the decrypted content is representative of an integral content.

24. The system according to claim 15, wherein reference positions occupy identical positions in the instruction groups.

25. The system according to claim 15, wherein the second instruction word is a no operation instruction (NOP).

26. The system according to claim 15, wherein the integral check indication is a checksum, and the verification module includes a calculation module configured, after decrypting the encrypted content, to calculate a new checksum, wherein the verification module is configured to compare a checksum present in the decrypted content to the new checksum.

27. The system according to claim 15, wherein the verification module includes an initial calculation module configured to calculate an additional checksum based on the basis of the compiled and encrypted program code.

28. The system according to claim 15, wherein the system is formed in a system-on-chip.

29. An information processing module comprising:
an interface coupleable to a communication medium and coupleable to an external memory;
a central processing unit arranged to execute instruction words of compiled and encrypted program code, wherein the compiled and encrypted program code includes instruction word groups, each instruction word group of the instruction word groups including first instruction words that result from a compilation of the program code and a second instruction word that does not result from the compilation of the program code, the second instruction word of the each instruction word group of the instruction word groups being identical and located respectively at a reference position in the each instruction word group of the instruction word groups
a cache memory having at least one level-one cache, the cache memory containing cache lines, each cache line of the cache lines having two separate and distinct fields, the two separate and distinct fields including an address field and a data field, wherein address information is stored in the address field and instruction words executable by the central processing unit are stored in the data field, the address information stored in the address field corresponding to an address in the external memory where the instruction words executable by the central processing unit are stored;
a control module configured to deliver to the interface on the communication medium, a command to read encrypted content of a memory location of the external memory containing a requested instruction word, the delivery carried out when the central processing unit requests the instruction word and when the requested instruction word is not present in the data field of a corresponding cache line of the cache memory, the interface configured to receive the encrypted content;
a decryption module configured to decrypt the encrypted content; and
a verification module to verify integrity of the decrypted content of the data field of a selected cache line before the requested instruction word is delivered, the verification module being configured to deliver the requested instruction word in response to a result of verifying the integrity of the decrypted content is representative of an integral content, wherein:
the decrypted content of the data field of the selected cache line contains a selected instruction word group having the first instruction words relating to the compiled and encrypted program code and having a check indication that is based on at least some of the first instruction words and located at the reference position in the selected cache line;
the verification module is configured to, before delivering the requested instruction word to the central processing unit, verify integrity of an integral check indication to produce a verification result, the integral check indication representing an integral nature of the decrypted content, and in response to the verification result is representative of an integral content, replace the check indication with the second instruction word.

30. The module according to claim 29, wherein the cache memory having the level-one cache has at least one higher-level cache, and wherein the decryption module is configured to decrypt the encrypted content locally at a level of the level-one cache.

31. The module according to claim 29, wherein the control module is configured to store the encrypted content in the data field of a selected cache line of the cache memory before decrypting the encrypted content.

32. The module according to claim 29, wherein the control module is configured to store decrypted content in the data field of a selected cache line of the level-one cache of the cache memory after the decryption of the encrypted content.

33. The module according to claim 29, wherein the decryption module is configured to carry out decryption of the encrypted content locally at a level of the level-one cache in response to a request by the central processing unit for an encrypted instruction word present in the data field of a selected cache line of the cache memory.

34. The module according to claim 29, wherein the control module is configured to deliver the requested instruction word to the central processing unit after the decryption module decrypts the encrypted content.

35. The module according to claim 29, wherein reference positions are identical for all the cache lines.

36. The module according to claim 29, wherein the second instruction word is a no operation instruction (NOP).

37. The module according to claim 29, wherein the integral check indication is a checksum, and the verification module includes a calculation module configured, after decrypting the encrypted content, to calculate a new checksum, wherein the verification module is configured to compare a checksum present in the decrypted content to the new checksum.

* * * * *